United States Patent
Rhee et al.

(10) Patent No.: US 11,297,082 B2
(45) Date of Patent: Apr. 5, 2022

(54) PROTOCOL-INDEPENDENT ANOMALY DETECTION

(71) Applicant: NEC Laboratories America, Inc., Princeton, NJ (US)

(72) Inventors: Junghwan Rhee, Princeton, NJ (US); LuAn Tang, Pennington, NJ (US); Zhengzhang Chen, Princeton Junction, NJ (US); Chung Hwan Kim, Pennington, NJ (US); Zhichun Li, Princeton, NJ (US); Ziqiao Zhou, Chapel Hill, NC (US)

(73) Assignee: NEC Corporation

( * ) Notice: Subject to any disclaimer, the term of this patent is extended or adjusted under 35 U.S.C. 154(b) by 292 days.

(21) Appl. No.: 16/535,521

(22) Filed: Aug. 8, 2019

(65) Prior Publication Data
US 2020/0059484 A1 Feb. 20, 2020

Related U.S. Application Data

(60) Provisional application No. 62/719,238, filed on Aug. 17, 2018.

(51) Int. Cl.
*H04L 29/06* (2006.01)
*G05B 19/418* (2006.01)

(52) U.S. Cl.
CPC ...... *H04L 63/1425* (2013.01); *G05B 19/4186* (2013.01); *H04L 63/1416* (2013.01); *G05B 2219/33244* (2013.01)

(58) Field of Classification Search
CPC ...... G05B 19/4186; G05B 2219/33244; H04L 63/1416; H04L 63/1425
See application file for complete search history.

(56) References Cited

U.S. PATENT DOCUMENTS

| 9,246,930 | B2 * | 1/2016 | Joo | .................. | H04L 63/1416 |
| 10,462,157 | B2 * | 10/2019 | Han | .................. | H04L 63/1416 |

(Continued)

FOREIGN PATENT DOCUMENTS

| GB | 2541969 | * | 3/2017 | ............ | H04L 29/06 |

OTHER PUBLICATIONS

Cui, "Discoverer: Automatic Protocol Reverse Engineering from Network Traces", 16th USENIX Security Symposium, Aug. 2007, pp. 199-212.

(Continued)

*Primary Examiner* — Joseph P Hirl
*Assistant Examiner* — Ka Shan Choy
(74) *Attorney, Agent, or Firm* — Joseph Kolodka

(57) ABSTRACT

A computer-implemented method for implementing protocol-independent anomaly detection within an industrial control system (ICS) includes implementing a detection stage, including performing byte filtering using a byte filtering model based on at least one new network packet associated with the ICS, performing horizontal detection to determine whether a horizontal constraint anomaly exists in the at least one network packet based on the byte filtering and a horizontal model, including analyzing constraints across different bytes of the at least one new network packet, performing message clustering based on the horizontal detection to generate first cluster information, and performing vertical detection to determine whether a vertical anomaly exists based on the first cluster information and a vertical model, including analyzing a temporal pattern of each byte of the at least one new network packet.

20 Claims, 11 Drawing Sheets

(56) References Cited

U.S. PATENT DOCUMENTS

| | | | | |
|---|---|---|---|---|
| 2003/0145232 A1* | 7/2003 | Poletto | ............... | H04L 63/1408 |
| | | | | 726/22 |
| 2005/0120243 A1* | 6/2005 | Palmer | ............... | H04L 63/1441 |
| | | | | 726/4 |
| 2012/0240185 A1* | 9/2012 | Kapoor | .................. | H04L 63/20 |
| | | | | 726/1 |
| 2017/0134401 A1* | 5/2017 | Medvedovsky | .... | H04L 63/1425 |
| 2019/0018955 A1* | 1/2019 | McGrew | ............ | G06F 11/1435 |

OTHER PUBLICATIONS

Leita, "ScriptGen: an automated Script Generation Tool for Honeyd", 21st Annual Computer Security Applications Conference, Dec. 2005, 12 pages.

* cited by examiner

400

---
Algorithm 1: Message Entropy Classification: classifyBytes()
---
Data: Normal Message Set $S$
Result: Horizontal variants
1   $L \leftarrow \max_{m \in S}(|m|)$;
2   $B = [1,...,L]$;
3   for $w = 1, 2, 4$ do
4      for $k = 1, ..., L\text{-}w$ do
5          Calculate entropy of bytes $k, k+1, ..., k+w-1$ among $S$ as $E_k$;
6          if $E_k == 0$ then
7              $BytesDirectCheck$.add($k, k+1, ..., k+w-1$);
8              $B$.remove($k, k+1, ..., k+w-1$);
9          if $E_k \approx log(|msgSet|)$ then
10         $B$.remove($k, k+1, ..., k+w-1$);
---

---
Algorithm 2: Horizontal Learning
---
Data: Normal Message Set $S$, byte-level anomaly false positive rate threshold $\alpha$, message-level anomaly false positive rate threshold $\beta$ ranging from $[0,1)$
Result: Horizontal Model $\vec{M}$ horizontal filter for bytes $B$, byte-level horizontal anomaly thresholds for detection $\vec{\sigma}$ and message-level horizontal anomaly thresholds for detection $\vec{\eta}$
1   $B \leftarrow$ classifyBytes($S$);
2   $n \leftarrow |B|$;
3   Divide $S$ into training, validation and testing sets: $S_{train}, S_{val}, S_{test}$;
4   for $k = 1, 2, ..., n - 1$ do
       /* Input Data $\leftarrow$ Bytes $B_{0:(k-1)}$ in $m$        */
       /* Label $\leftarrow$ Byte $B_k$ in $m$        */
5      Train LSTM model $\vec{M_k}$ based on corresponding inputs and labels;
6   $\vec{\sigma} \leftarrow$ genByteThresholdHorizontal($\alpha, S$);
7   $\vec{\eta} \leftarrow$ genMsgThresholdHorizontal($\vec{\sigma}, \beta, S$);
---

Algorithm 3: genByteThresholdHorizontal

Data: Normal Message Set $S$, Horizontal models $M_{0,1,2,\ldots,n}^{\rightarrow}$, byte-level anomaly false positive rate threshold $\alpha$

Result: byte-level anomaly thresholds for detection $\sigma_{0,1,2,\ldots,n}^{\rightarrow}$ 1  for $k = 1, 2, \ldots, n-1$ do
2      $minlist \leftarrow [\,]$;
3      $maxlist \leftarrow [\,]$;
4      for $m \in S$ do
5        Get conditional probability distribution
           $p_k^{\rightarrow} \leftarrow M_k^{\rightarrow}(m[B_{0:(k-1)}])$;
6        $Pmax = p_k^{\rightarrow}(m[B_k])/\max(p_k^{\rightarrow})$;
7        $Pmin = p_k^{\rightarrow}(m[B_k])/\min(p_k^{\rightarrow})$;
8        $maxlist.\text{add}(Pmax)$;
9        $minlist.\text{add}(Pmin)$;
10     sort $minlist$ and $maxlist$ in an ascending order;
11     $\sigma_k^{\rightarrow}.min \leftarrow minlist[|S_{test}| \cdot \alpha]$;
12     $\sigma_k^{\rightarrow}.max \leftarrow maxlist[|S_{test}| \cdot \alpha]$;

Algorithm 4: genMsgThresholdHorizontal()

Data: Normal Message Set $S$, Horizontal models $M_{0,1,2,\ldots,n}^{\rightarrow}$, byte-level horizontal anomaly threshold $\sigma^{\rightarrow}$ for detection, msg-level anomaly false positive rate threshold $\beta$

Result: Message-level horizontal anomaly thresholds for detection $\eta^{\rightarrow}$ 1  $violatedlist \leftarrow [\,]$;
2  for $m \in S$ do
3      $violation \leftarrow \text{checkByteViolation}(m, M^{\rightarrow}, B, \sigma^{\rightarrow})$;
4      $violatedlist.\text{add}(violation)$
5  sort $violatedlist$ by a descending order;
6  $\eta^{\rightarrow} \leftarrow violatedlist[|S| \cdot \beta]$

Algorithm 5: checkByteViolation()

Data: Incoming msg $m$, probability distribution $\vec{p}$, byte-level horizontal anomaly threshold $\vec{\sigma}$
Result: How many bytes are violated?

1   $n \leftarrow |B|$;
2   $violation \leftarrow 0$;
3   for $k = 1, 2, \ldots, n-1$ do
4     if $m[B_k]$ *is not a known value from* $\vec{p}_k$ then
5       $violation \mathrel{+}= 1$;
6       continue;
7     $Pmax = \vec{p}_k(v)/\max(\vec{p}_k)$;
8     $Pmin = \vec{p}_k(v)/\min(\vec{p}_k)$;
9     if $Pmax < \vec{\sigma}_k.max$ *and* $Pmin < \vec{\sigma}_k.min$ then
10       $violation \mathrel{+}= 1$;

11   return $violation$;

Algorithm 7: clusterMsgByByte: Clustering msg with same semantic meaning at byte $B_k$

Data: Normal Message set $S$, Horizontal model $\vec{M}_k$ for byte at offset $B_k$, cluster std: $\varepsilon$, clustering threshold $T$
Result: Probability distribution template per cluster: $\bar{p}_{1,\ldots,c}$, message subsets with similar probability distributions at Byte $B_k$: $S_{1,2,\ldots,c}$ 1   $problist \leftarrow [\,]$;
2   for $m \in S$ do
3     $\vec{p} = \vec{M}_k(m[B_{0,1,\ldots,k-1}])$;
4     if $entropy(\vec{p}^m) > T$ then
5       $problist.append(\vec{p})$ 6   $S_1, S_2, \ldots, S_c = Cluster(problist, \varepsilon)$;
7   if $c$ *is too large* then
8     Merge all cluster into one;
9     $c = 1$;

10   for $i = 1, 2, 3, \ldots, c$ do
11     $\bar{p}_i = avg_{m \in S_i}(\vec{p} \text{ of } m)$

Algorithm 8: Vertical Learning

Data: Normal Message set $S$, Byte Filter $B_k$, anomaly false positive rate thresholds $\alpha$(byte-level), $\beta$(message-level)

Result: Vertical Models $M^{\downarrow}$, $PT_{1...k}$, Vertical anomaly thresholds $\sigma^{\downarrow}$ (byte-level), $\eta^{\downarrow}$ (message-level)

1. $n \leftarrow |B|$;
2. for $k=1,2,...,n$ do
3.      $\bar{p}_{1...c}, S_{1,2,...,c} = \text{clusterMsgByByte}(S, M_k^{\rightarrow}, B_k, \epsilon)$;
4.      $PT_k \leftarrow (\bar{p}_{1...c})$;
5.      if $c == 0$ then
            /* $M_k^{\rightarrow}$ is constrained by horizontal model */
6.          continue;
7.      for $j=1,2,...,c$ do
8.          Generate dataset $S_j[B_k]$ using byte $B_k$ for each $m \in S_j$;
9.          Divide $S_j[B_k]$ into training and validation set;
10.          for $step=1, 2, 3, ...,$ *encoding as continous / discrete value* do
                 /* Arrange dataset: $i$ th input is composed with $B_k$th byte values of $m_{t-1}, m_{t-2}, ..., m_{t-step}$ (where $t=(i-1)\cdot step+1$) and the corresponding output is $B_k$th byte for current message $m_t$ */
11.              Train $M_{k,j}^{\downarrow}$;
                 /* Use cross-entropy/MSE as loss when encoding as discrete/continous variable */
             /* Choose the best *step* and encoding style base on accuracy */
         /* Generate Anomaly Thresholds similar to horizontal learning; */
12.      $\sigma^{\downarrow} \leftarrow \text{genByteThresholdVertical}(\alpha, S)$;
13.      $\eta^{\downarrow} \leftarrow \text{genMsgThresholdVertical}(\sigma^{\downarrow}, \beta, S)$;

| Algorithm 6: Horizontal Detection (message level) |
|---|
| Data: Incoming message $m$, Horizontal models $\vec{M}$, B, Horizontal anomaly thresholds $\vec{\sigma}$, $\vec{\eta}$ |
| Result: Is this an anomaly? |
| 1 for $k = 1, 2, \ldots, n-1$ do |
| 2 $\quad$ Get conditional probability distribution $\vec{p}_k \leftarrow \vec{M}_k(m[B_{0:(k-1)}])$; |
| 3 $violation \leftarrow \text{checkByteViolation}(m, \vec{p}, \vec{\sigma})$; |
| 4 if $violation > \vec{\eta}$ then |
| 5 $\quad$ return True; |
| 6 else |
| 7 $\quad$ return False; |

| Algorithm 9: Vertical Detection |
|---|
| Data: Message $m_t$, Byte Filter B, Probability distribution templates per cluster PT, Horizontal Models $\vec{M}$, Vertical Models $\vec{M}^{\downarrow}$, vertical anomaly thresholds for detection $\sigma^{\downarrow}$ (byte-level), $\eta^{\downarrow}$ (message-level), clustering threshold $T$ |
| Result: Is this a vertical anomaly? |
| 1 $n = |B|$; |
| 2 for $k = 1, 2, \ldots, n$ do |
| 3 $\quad \vec{p}_k = \vec{M}_k(m[B_{0,1,\ldots,(k-1)}])$; |
| 4 $\quad$ if $\text{entropy}(\vec{p}_k) < T$ then |
| 5 $\quad\quad$ return False; |
| 6 $\quad j = \text{getClosestClusterID}(PT_k, \vec{p}_k)$; |
| 7 $\quad step \leftarrow M^{\downarrow}_{k,j}.step$; |
| 8 $\quad p^{\downarrow}_k \leftarrow M^{\downarrow}_{k,j}(m_{t-1}[B_k], m_{t-2}[B_k], \ldots, m_{t-step}[B_k])$; |
| 9 $violation = \text{checkByteViolation}(m, p^{\downarrow}, \sigma^{\downarrow})$; |
| 10 if $violation > \eta^{\downarrow}$ then |
| 11 $\quad$ return True; |
| 12 else |
| 13 $\quad$ return False; |

PROTOCOL-INDEPENDENT ANOMALY DETECTION

RELATED APPLICATION INFORMATION

This application claims priority to provisional application Ser. No. 62/719,238, filed on Aug. 17, 2018, incorporated herein by reference herein its entirety.

BACKGROUND

Technical Field

The present invention relates to computer security architectures, and more particularly to protocol-independent anomaly detection.

Description of the Related Art

Control computer systems are growing and getting increasing attention from security attacks. Examples of such security attacks include, e.g., Stuxnet, VPNFilter, and Mirai. Due to high requirements and stability of devices in some control computer systems, it can be difficult to deploy host-level security solutions.

SUMMARY

According to an aspect of the present principles, a method is provided for implementing protocol-independent anomaly detection within an industrial control system (ICS). The method includes implementing a detection stage. Implementing the detection stage includes performing byte filtering using a byte filtering model based on at least one new network packet associated with the ICS, and performing horizontal detection to determine whether a horizontal constraint anomaly exists in the at least one network packet based on the byte filtering and a horizontal model. Performing the horizontal detection includes analyzing constraints across different bytes of the at least one new network packet. Implementing the detection stage further includes performing message clustering based on the horizontal detection to generate first cluster information, and performing vertical detection to determine whether a vertical anomaly exists based on the first cluster information and a vertical model. Performing the vertical detection includes analyzing a temporal pattern of each byte of the at least one new network packet.

According to another aspect of the present principles, a system is provided for implementing protocol-independent anomaly detection within an industrial control system (ICS). The system includes a memory device for storing program code, and at least one processor device operatively coupled to a memory device. The at least one processor device is configured to execute program code stored on the memory device to implement a detection stage. The at least one processor device is configured to implement the detection stage by performing byte filtering using a byte filtering model based on at least one new network packet associated with the ICS, and performing horizontal detection to determine whether a horizontal constraint anomaly exists in the at least one network packet based on the byte filtering and a horizontal model. Performing the horizontal detection includes analyzing constraints across different bytes of the at least one new network packet based on a horizontal model. The at least one processor device is further configured to implement the detection stage by performing message clustering based on the horizontal detection to generate first cluster information, and performing vertical detection to determine whether a vertical anomaly exists based on the first cluster information and a vertical model. Performing the vertical detection includes analyzing a temporal pattern of each byte of the at least one new network packet.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 4 is a diagram illustrating an exemplary byte filtering method implemented by the architecture of FIG. 3, in accordance with an embodiment of the present invention;

FIG. 5 is a diagram illustrating an exemplary horizontal learning method implemented by the architecture of FIG. 3, in accordance with an embodiment of the present invention;

FIG. 6 is a diagram illustrating an exemplary method for generating byte-level anomaly thresholds for detection implemented by the architecture of FIG. 3, in accordance with an embodiment of the present invention;

FIG. 7 is a diagram illustrating an exemplary method for generating message-level horizontal anomaly thresholds for detection implemented by the architecture of FIG. 3, in accordance with an embodiment of the present invention;

FIG. 8 is a diagram illustrating an exemplary violation counting method implemented by the architecture of FIG. 3, in accordance with an embodiment of the present invention;

FIG. 9 is a diagram illustrating an exemplary message clustering method implemented by the architecture of FIG. 3, in accordance with an embodiment of the present invention;

FIG. 10 is a diagram illustrating an exemplary vertical learning method implemented by the architecture of FIG. 3, in accordance with an embodiment of the present invention;

FIG. 11 is a diagram illustrating an exemplary horizontal detection method implemented by the architecture of FIG. 3, in accordance with an embodiment of the present invention;

FIG. 12 is a diagram illustrating an exemplary vertical detection method implemented by the architecture of FIG. 3, in accordance with an embodiment of the present invention;

DETAILED DESCRIPTION OF PREFERRED EMBODIMENTS

Figure 1:
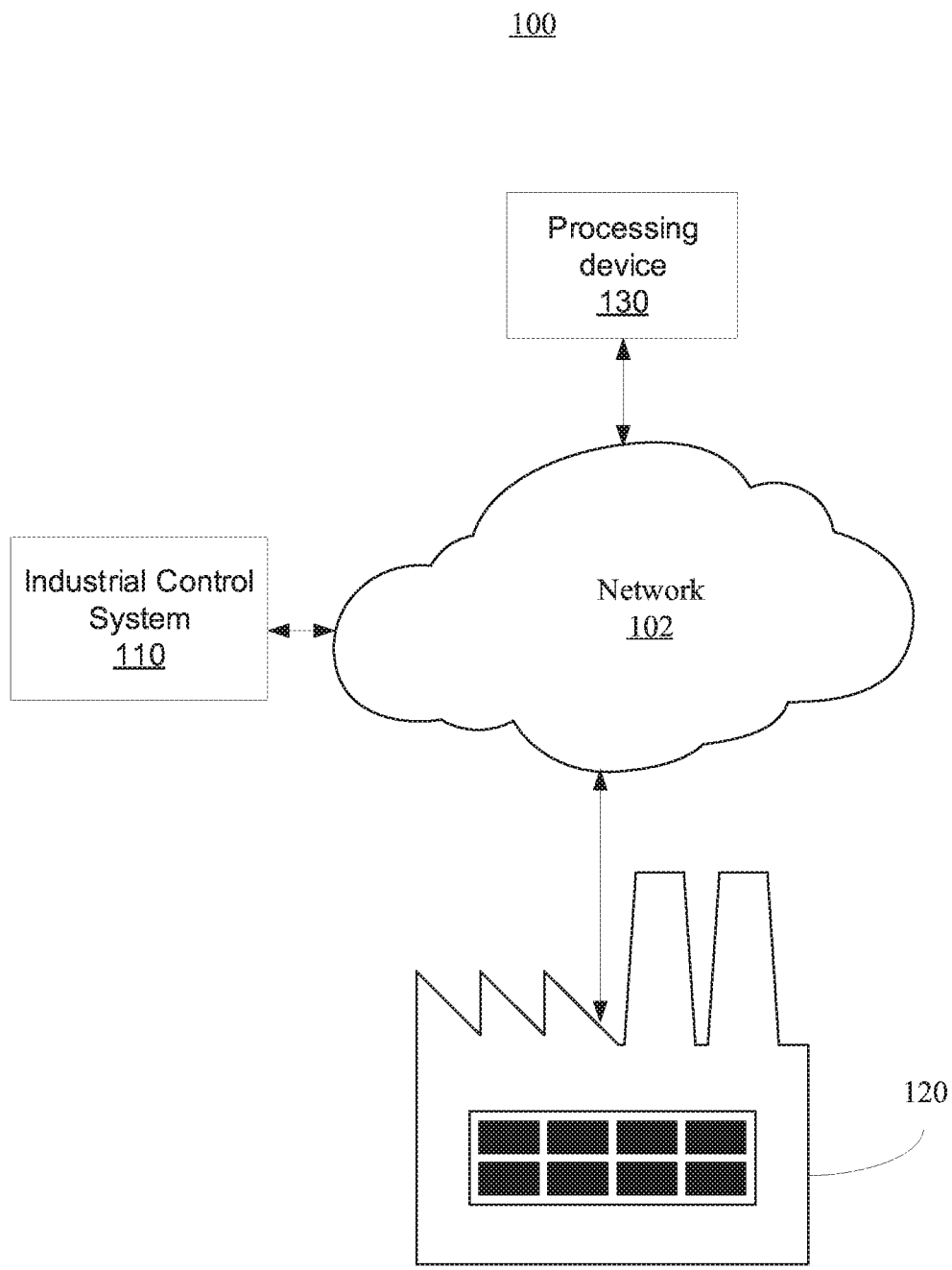
FIG. 1 is a block/flow diagram illustrating a high-level overview of an Industrial Control System (ICS), in accordance with an embodiment the present invention.

The embodiments described herein provide for anomaly detection for control computer systems without requiring prior knowledge of protocols, referred to herein as protocol-independent or protocol-agnostic anomaly detection. Illustratively, the embodiments described herein can provide anomaly detection for Industrial Control Systems (ICS). For example, anomaly detection can be provided for Operational Technology (OT) network or system traffic without requiring prior knowledge of OT network or system protocols. Thus, the embodiments described herein can provide for ICS security solutions without manual analysis, thereby providing applicability to ICS systems having proprietary or unknown network protocols and extensions that can be hard to reverse engineer. Accordingly, the embodiments described herein can reduce consumption of time and resources in designing security solutions for control computer systems.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high-level overview of a system 100 is illustratively depicted. As shown, the system 100 can include an Industrial Control System (ICS) 110 and a factory 120 connected to a network 102. For example, the ICS 110 can include an Operational Technology (OT) network or system. The ICS 110 can control components of the factory 120. It is to be understood and appreciated that the ICS 110 can be configured to control any suitable environment in accordance with the embodiments described herein. Although the ICS 110 is depicted as being outside of the factory 120, in other embodiments, the ICS 110 can be located within the factory 120.

If an adversary has access to the network 100, the adversary may be able to send malicious packets to the ICS 110 to comprise and control the ICS 110 for malicious purposes. To combat such attacks on the ICS 110, the system 100 can further include at least one processing device 130 connected to the network 102. Although the at least one processing device 130 is depicted as being a standalone component, in other embodiments, the at least one processing device 130 can be a component of the ICS 110 and/or a component located within the factory 120.

The at least one processing device 130 can be configured to monitor network traffic being exchanged within the network 100 (e.g., passive monitoring). As will be described in further detail below, the at least one processing device 130 can implement protocol-independent anomaly detection in order to detect attacks to the components 102, 110 and/or 120, thereby providing network security. For example, the at least one processing device 130 can monitor network traffic patterns in normal usage and construct a normal usage model based on the normal usage. Later, when an attacker sends malicious traffic, the at least one processing device 130 can detect that the malicious traffic is an anomaly as compared to the normal usage model, which can signal that the malicious traffic is indeed an attack that needs to be addressed.

Figure 2:
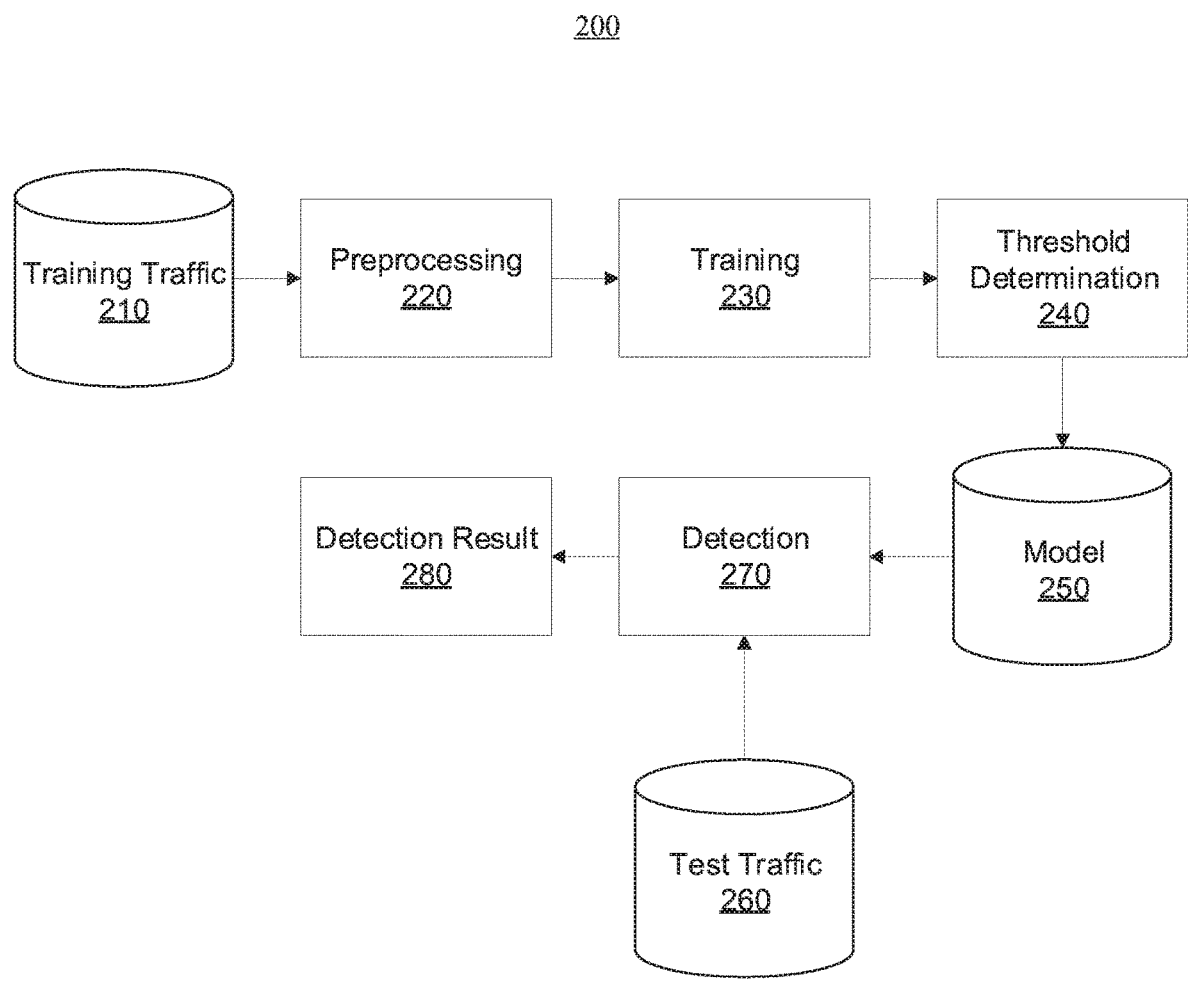
FIG. 2 is a block/flow diagram illustrating a high-level overview of an architecture for implementing protocol-independent anomaly detection, in accordance with an embodiment the present invention.

Referring now to FIG. 2, a block/flow diagram is provided illustrating a high-level overview of a system/method 200 for protocol-independent anomaly detection is illustratively depicted in accordance with one embodiment of the present principles. For example, the system/method 200 can employ protocol-independent deep-learning-based anomaly detection. The system/method 200 can be implemented to perform anomaly detection within the context of an ICS (e.g., an OT network). More specifically, the system/method 200 can be implemented to perform anomaly detection of ICS network packets without knowing their protocol structures. For example, the system/method 200 can be implemented by the at least one processing device 130 of FIG. 1.

Assuming there is no ongoing attack during the installation stage, a training stage can include generating training traffic 210 by capturing training network traffic. Preprocessing component 220 preprocesses the training traffic 210, which can include categorizing traffic having same sources and destinations. Training component 230 can then generate a machine learning model by applying a machine learning process to the preprocessed traffic. Threshold determination component 240 can automatically determine thresholds for deciding whether an event is an anomaly. The training stage generates a model 250, which is a machine learning model that summarizes network traffic patterns.

In real usage, a testing stage can include generating test traffic 260 by capturing test network traffic. The test network traffic can include benign and/or malicious traffic. Detection component 270 can then compare the model 250 to the test traffic 260 to determine whether the test traffic 260 is different from the model 250 based on the determined thresholds. If the test traffic 260 is determined to be different from the model 250, a security anomaly is reported. Otherwise, no security anomaly is reported. Detection result 280 shows whether the tested traffic is benign or malicious.

Further details regarding the system/method 200 will now be described below with reference to FIG. 3.

Figure 3:
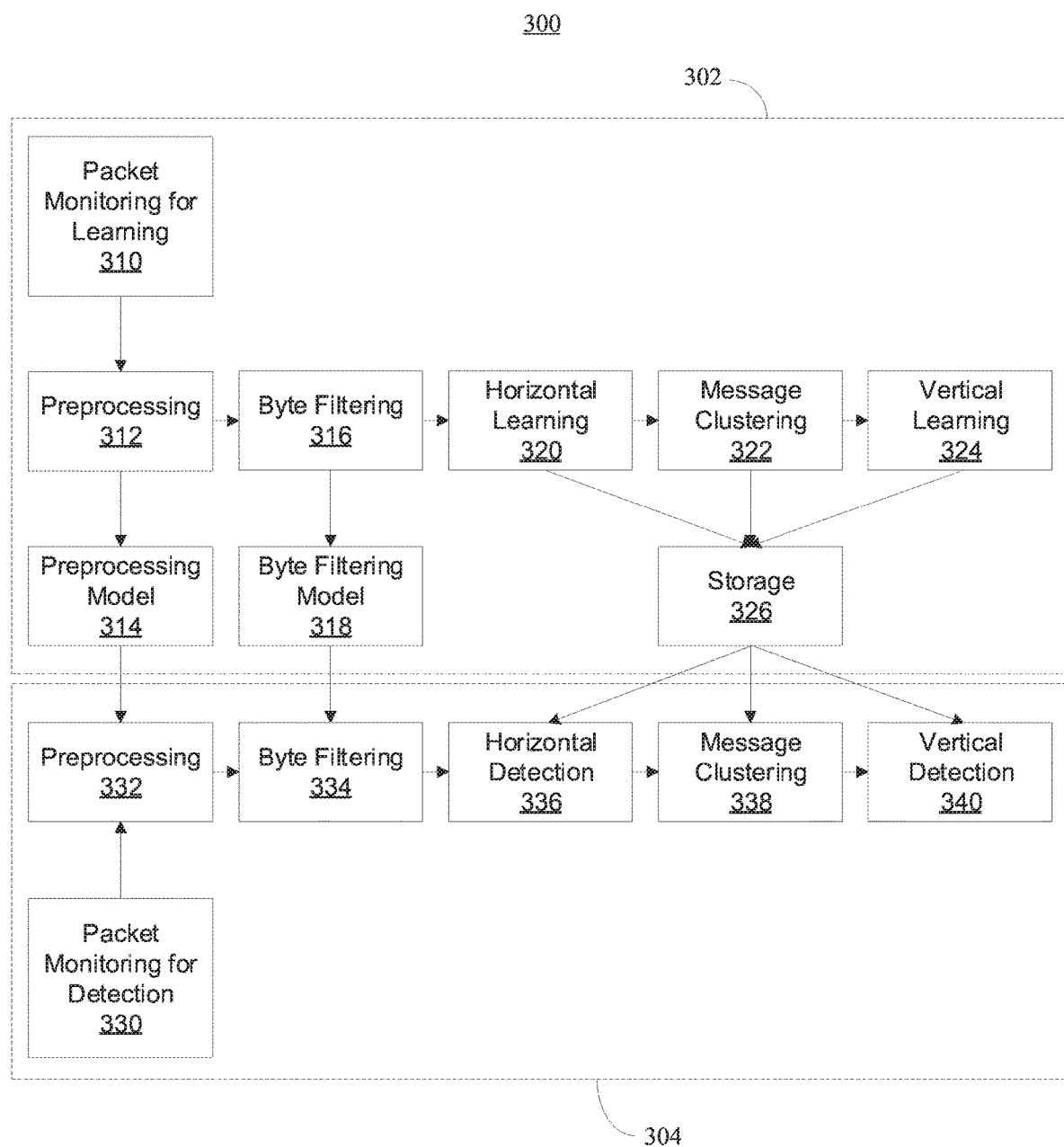
FIG. 3 is a block/flow diagram illustrating an exemplary architecture for implementing protocol-independent anomaly detection, in accordance with an embodiment the present invention.

With reference to FIG. 3, a block/flow diagram is provided illustrating an architecture 300 for protocol-independent anomaly detection. For example, the architecture 300 can employ protocol-independent deep-learning-based anomaly detection. The architecture 300 can be implemented to perform anomaly detection within the context of an ICS (e.g., OT network). More specifically, the architecture 300 can be implemented to perform anomaly detection of ICS network packets without knowing their protocol structures. For example, the architecture 300 can be implemented by the at least one processing device 130 of FIG. 1.

More specifically, the architecture 300 can include a learning stage 302 and a detection stage 304. As a high-level overview, the detection mechanism can be based on at least two types of models, including a horizontal model (or horizontal constraint) and a vertical model (or vertical constraint). The horizontal model refers to the relationship among different byte offsets of the same packet, and can capture the dependency across different protocol fields and the range of values. The vertical model refers to a temporal relationship of the same byte offset across different network packets, and captures temporal characteristics of a time series of a particular byte offset of packets such as a sequence of values or abnormal jump of values. As will be described in further detail below, deep learning techniques can be used to generate the horizontal and vertical models.

During the learning stage 302, network traffic patterns are analyzed and learned. Deep learning techniques can be used to discover constraints across different fields and across multiple packets over time.

For example, a packet monitoring for learning component 310 can monitor network interfaces for a network (e.g., ICS network) and record network packets for learning. The recorded network packets can be stored either in a file or memory.

A preprocessing component 312 can process the network packets by grouping the network packets. The networks packets can be grouped by source Internet Protocol (IP) address, source port number, destination IP address, destination port number, and/or protocol number (e.g., a 5-tuple). Each group based on network 5-tuples can be referred to as a "session" and the learning and detection is performed on each session. The possible patterns from the learned packets can be stored in a preprocessing model 314.

A byte filtering component 316 can analyze a list of bytes of each packet that is not suitable for learning or detection. For example, the bytes of invariants and a sequence number can have obvious patterns, which can be handled without explicit learning. The output of the byte filtering component 316 can be stored in a byte filtering model 318.

For example, the byte filtering component 316 can receive, as input, a dataset of network packets in a normal condition, set S, and output horizontal variants, which include a list of offsets to be used for horizontal analysis. More specifically, the byte filtering component 316 can try a plurality of time windows of various lengths (e.g., 1, 2 and 4) to capture a different length of values (e.g., short integer, integer, long integer). For a byte offset k for all of the packets of S, an entropy of a time window starting from the offset k, $E_k$, can be calculated. If $E_k=0$, it is a constant value. Because this constraint is a clear constraint, it can be recorded and directly checked. A high value of $E_k$ corresponds to a very diverse pattern (e.g., each packet has a unique value), similar to a serial number. Thus, both zero-value entropies and high-value entropies can be excluded from learning. An example of an method that can be implemented by the byte filtering component 316 ("Algorithm 1: Message Entropy Classification: classifyBytes( )") is illustrated with reference to diagram 400 of FIG. 4.

Referring back to FIG. 3, for anomaly detection, a horizontal learning component 320 can learn constraints across different bytes of packets. The output of the horizontal learning component 320 can include a horizontal model.

For example, the horizontal learning component 320 can receive, as inputs, a dataset of network packets in a normal condition, set S, a byte-level anomaly false positive threshold α, and a message-level anomaly false positive threshold β, where α, β∈[0,1). Based on the inputs, the horizontal learning component 320 can generate outputs including a horizontal model M, a horizontal filter for bytes B, internal byte-level horizontal anomaly thresholds for detection σ, and internal message-level anomaly thresholds for detection η.

More specifically, the set B can be generated based on the output of the byte filtering component 316, where n is the size of B. Then, set S can be divided into a training dataset $S_{train}$, a validation dataset $S_{val}$, and a testing dataset $S_{test}$. For each byte offset k=1, 2, ..., n−1, a deep learning model can be trained based on the input and labels. More specifically, the input can include the filtered bytes from the offset 0 to k−1, and the label can include the filtered byte at the offset k. In one embodiment, the deep learning model includes a long short-term memory (LSTM) deep learning model. An example of a method that can be implemented by the horizontal learning component 320 to perform horizontal learning ("Algorithm 2: Horizontal Learning") is illustrated with reference to diagram 500 of FIG. 5.

The internal byte-level thresholds for detection σ can be generated based on the threshold α and the set S. More specifically, to generate a threshold $\sigma_k$, the horizontal learning component 320 can initialize a minlist and a maxlist. Then, for a message m in the set S, the horizontal learning component 320 can calculate a conditional probability distribution (CPD) for the bytes from 0 to k−1, calculate a relative maximum threshold $P_{max}$ by dividing the CPD by a maximum CPD and a relative minimum threshold $P_{min}$ by dividing the CPD by a minimum CPD, and add $P_{max}$ and $P_{min}$ to a maxlist and a minlist, respectively. The minlist and the maxlist can be sorted in ascending order. Then, a minimum value and a maximum value can be set based on the threshold α and the set S. For example, the minimum value for $\sigma_k$ can be set as minlist [$|S_{test}|$ α] and the maximum value for $\sigma_k$ can be set as maxlist [$|S_{test}|$ α]. An example of a method that can be implemented by the horizontal learning component 320 to generate the threshold σ ("Algorithm 3: genByteThresholdHorizontal") is illustrated with reference to diagram 600 of FIG. 6.

The internal message-level thresholds for detection η can be generated based on the thresholds σ and β and set S. More specifically, to generate the threshold η, the horizontal learning component 320 can initialize a violated list ("violatedlist"). Then, for the message m, a number of violations or anomalies of each packet are calculated.

After the number of violations are calculated, the number of violations can be added to the violated list. The violated list can be sorted in descending order, and the threshold η is set using the message order calculated by the input rate threshold β and the size of the entire message set S. For example, the threshold η can be set as violatedlist [|S| β]. An example of a method that can be implemented by the horizontal learning component 320 to generate the threshold η ("Algorithm 4: genMsgThresholdHorizontal( )") is illustrated with reference to diagram 700 of FIG. 7.

The number of violations added to the violated list can be calculated by checking byte violations for the message m. For example, for each k=1, 2, . . . , n−1, if the byte has an unknown value based on the probability distribution, an anomaly is counted. A maximum and minimum predicted value, Pmax and Pmin, can be calculated based on the probability distribution. Pmax and Pmin can be compared to respective ones of the internal byte-level anomaly thresholds for detection $\sigma_k$ to determine whether or not to count an anomaly. Then, the total number of anomalies can be returned. An example of a method that can be implemented by the horizontal learning component 320 to calculate the number of violations ("Algorithm 5: checkByteViolation( )") is illustrated with reference to FIG. 8. Since network packets can have multiple heterogeneous structures, each byte can represent different meanings. For example, the tenth byte of the first packet can be, e.g., a length of a packet ("Structure A"), while the tenth byte of the second packet can be, e.g., a temperature value ("Structure B"). Because we do not assume knowledge of a protocol, we cannot know whether the bytes of the packet represent structure A or structure B.

A message clustering component 322 can perform clustering of packets based on the output of the horizontal learning component 320. The output of the message clustering component 322 can include clustered packets. For example, the message clustering component 322 can cluster message (packets) with a similar inferred semantic meaning at the byte offset k, and can output a probability distribution template per cluster, message subsets with a similar probability distribution at the byte offset k.

More specifically, for each message m, a probability distribution can be calculated using the horizontal model and the message bytes from offset 0 to k−1. If the entropy of the probability distribution is higher than a clustering threshold, it can be added to a list, referred to herein as problist. A clustering method (e.g., density-based clustering) with parameters including problist and clustering standard deviation can be used to generate c clusters. If the number of clusters is too high (c is too large), then all clusters can be merged into one and c is set to 1. A probability distribution template per cluster can then be calculated for each i=1, 2, 3, . . . , c.

An example of a method that can be implemented by the message clustering component 322 to perform message clustering ("Algorithm 7: clusterMsgByByte) is illustrated with reference to diagram 900 of FIG. 9.

Once the packets are clustered together, it is expected that the packets have a similar structure. A vertical learning component 324 can learn temporal patterns of messages based on the clustering. For example, the vertical learning component 324 can analyze the tenth byte values of each of n packets as a time series. The output of the vertical learning component 324 can include vertical model.

For example, for each byte offset k=1, 2, . . . , n, message clustering can be used to generate clusters and probability distribution templates. If the size of the clusters is 0, then the horizontal model is too strict, and the process continues to another value k. For each cluster j=1, c, a dataset $S_j$ is generated using the byte filter for each message in the dataset $S_j$. The dataset $S_j$ can then be divided into a training and validation set. Then, dataset arranging is performed, a vertical model is trained, and a loss function is used. Cross-entropy can be used with discrete variable encoding and mean square error can be used with continuous variable encoding. The best step and encoding style can be chosen based on accuracy. Then, byte-level and message-level vertical anomaly detection thresholds can be generated in a similar manner as described above with reference to the horizontal learning component 320.

An example of a method that can be implemented by the vertical learning component 324 to perform vertical learning ("Algorithm 8: Vertical Learning) is illustrated with reference to diagram 1000 of FIG. 10.

The outputs of components 320-324 can each be stored in storage component 326.

During the detection stage 304, a new network packet is analyzed to detect any existing anomaly based on the new network packet.

For example, a packet monitoring for detection component 330 can monitor network interfaces for a network (e.g., ICS network) and record network packets for detection. The recorded network packets can be stored either in a file or memory, similar to the packet monitoring for learning component 310.

Similar to the preprocessing component 312, the preprocessing component 332 can process the network packets by grouping the network packets. The networks packets can be grouped by source IP address, source port number, destination IP address, destination port number, and/or protocol number (e.g., a 5-tuple). Each group based on network 5-tuples can be referred to as a "session" and the learning and detection is performed on each session.

The preprocessing component 332 can further receive the preprocessing model 314. If any traffic is new and not found in the preprocessing model 314, the preprocessing component 332 can trigger an alert.

A byte filtering component 334 can analyze a list of bytes of the new network packet that is not suitable for detection. More specifically, the byte filtering component 334 can determine whether the byte values of the new network packet are included within the byte filtering model 318. If any new violating pattern is found, the byte filtering component 334 can trigger an alert. The byte filtering component 334 can implement a method similar to that of the byte filtering component 316 (e.g. using the "Algorithm 1: Message Entropy Classification: classifyBytes( )" method of FIG. 4).

For anomaly detection, a horizontal detection component 336 can detect whether a horizontal constraint anomaly exists in the new network packet based on the horizontal model generated by the horizontal learning component 320.

More specifically, the horizontal detection component 336 can determine whether the new network packet is an anomalous packet based on an incoming message m. For example, for each byte offset k, a conditional probability distribution can be calculated for the bytes from 0 to k−1. Given the message m, the conditional probability distribution and the byte-level anomaly threshold, the number of anomalies or violations can be calculated (e.g., using the "checkByteViolation" method of FIG. 8). Then, if the total number of violations exceeds a threshold, the new network packet is determined to be an anomaly. Otherwise, the new network packet is determined to be normal.

An example of a method that can be implemented by the horizontal detection component 336 to perform horizontal learning ("Algorithm 6: Horizontal Detection (message level)") is illustrated with reference to diagram 1100 of FIG. 11.

A message clustering component 338 can determine a cluster of the new network packet based on the probability distribution of the horizontal model. The message clustering component 338 can output cluster information. The message clustering component 338 can operate similar to the message clustering component 322 (e.g., using the "clusterMsgByByte" method of FIG. 9.

A vertical detection component 340 can analyze the temporal pattern of each byte of the new network packet to determine whether a vertical anomaly exists. The analysis performed by the vertical detection component 340 can be based on the cluster information output by the message clustering component 338, and the vertical model generated by the vertical learning component 324.

For example, for each byte offset k, a horizontal probability distribution can be calculated using a horizontal model. If the entropy of the horizontal probability distribution is less than a threshold, then false can be returned. A closest cluster ID can be obtained using the horizontal probability distribution and probability distribution template. A vertical probability distribution can be calculated for a step number of messages using vertical models, where W can refer to the size of the time window. The number of violations can be determined. If the number of violations exceeds a threshold, then true can be returned. Otherwise, false can be returned.

An example of a method that can be implemented by the vertical detection component 340 to perform vertical detection ("Algorithm 9: Vertical Detection") is illustrated with reference to diagram 1200 of FIG. 12.

Figure 13:
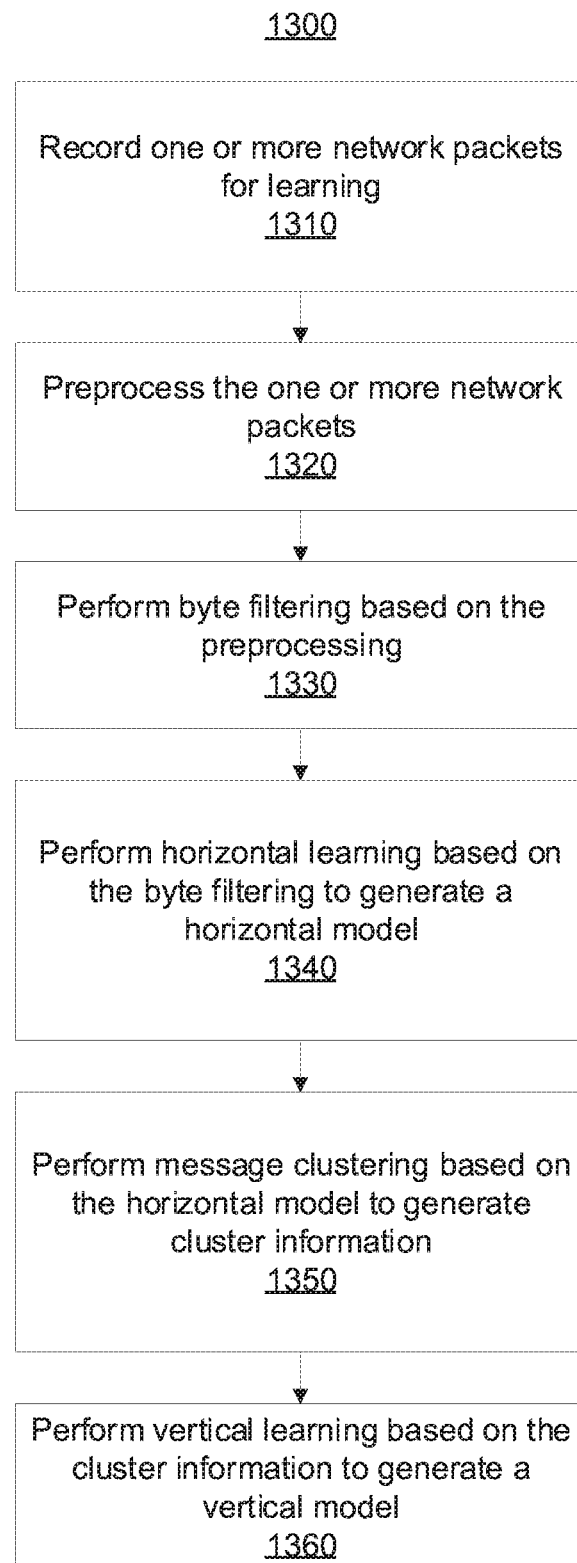
FIG. 13 is a block/flow diagram illustrating a system/method for implementing a learning stage of protocol-independent anomaly detection, in accordance with an embodiment the present invention.

With reference to FIG. 13, a block/flow diagram is provided illustrating a system/method 1300 for implementing a learning stage of protocol-independent anomaly detection. During the learning stage, network traffic patterns are analyzed and learned, using deep learning techniques to discover constraints across different fields and across multiple packets over time.

For example, at block 1310, one or more network packets can be recorded for learning. Recording the one or more network packets can include monitoring one or more network interfaces for a network (e.g., an ICS network). The one or more network packets can be stored either in a file or memory. Further details regarding block 1310 are described above with reference to component 310 of FIG. 3.

At block 1320, the one or more network packets can be preprocessed. The preprocessing can generate an output including a preprocessing model. Preprocessing the one or more network packets can include grouping the one or more network packets. The one or more network packets can be grouped by source IP address, source port number, destination IP address, destination port number, and/or protocol number (e.g., a 5-tuple). Each group based on network 5-tuples can be referred to as a "session" and the learning and detection is performed on each session. The possible patterns from the learned packets can be stored in the preprocessing model. Further details regarding block 1320 are described above with reference to components 312 and 314 of FIG. 3.

At block 1330, byte filtering can be performed based on the preprocessing. Performing byte filtering can include analyzing a list of bytes of each packet that is not suitable for learning or detection. For example, the bytes of invariants and a sequence number can have obvious patterns, which can be handled without explicit learning. The output of the byte filtering component can be stored in a byte filtering model. Further details regarding block 1330 are described above with reference to components 316 and 318 of FIG. 3 and diagram 400 of FIG. 4.

At block 1340, horizontal learning is performed based on the byte filtering to generate a horizontal model. Horizontal learning can include learning constraints across different bytes of packets. Horizontal learning can be performed based on an input including a dataset of network packets in a normal condition and a first set of thresholds. For example, the set of thresholds can include, e.g., a byte-level anomaly false positive threshold and a message-level anomaly false positive threshold.

The horizontal model refers to the relationship among different byte offsets of the same packet, and can capture the dependency across different protocol fields and the range of values. The output of the horizontal learning can further include, e.g., a horizontal filter and a second set of thresholds. The second set of thresholds can include, e.g., internal byte-level horizontal anomaly thresholds for detection and internal message-level anomaly thresholds for detection. Further details regarding block 1340 are described above with reference to component 320 of FIG. 3 and diagrams 500-800 of FIGS. 5-8, respectively.

Since network packets can have multiple heterogeneous structures, each byte can represent different meanings. For example, the tenth byte of the first packet can be, e.g., a length of a packet ("Structure A"), while the tenth byte of the second packet can be, e.g., a temperature value ("Structure B"). Because we do not assume knowledge of a protocol, we cannot know whether the bytes of the packet represent structure A or structure B.

At block 1350, message clustering is performed based on the horizontal learning to generate cluster information. The message clustering can generate clustered messages or packets based on the output of the horizontal learning, and output the corresponding cluster information. Once the packets are clustered together, it is expected that the packets have a similar structure. Further details regarding block 1350 are described above with reference to component 322 of FIG. 3 and diagram 900 of FIG. 9.

At block 1360, vertical learning is performed based on the cluster information to generate a vertical model. The vertical learning can include learning temporal patterns of messages. For example, the vertical learning can analyze byte values of each of packets as a time series. Further details regarding block 1360 are described above with reference to component 324 of FIG. 3 and diagram 1000 of FIG. 10.

Figure 14:
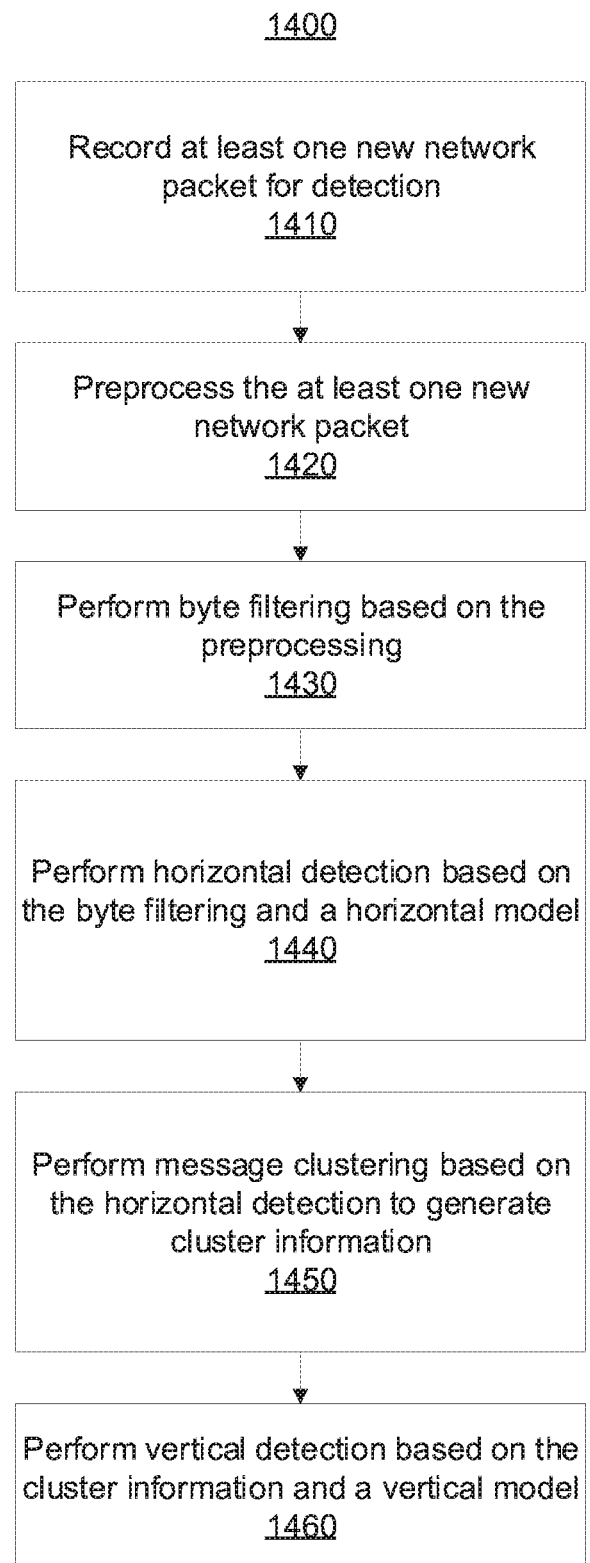
FIG. 14 is a block/flow diagram illustrating a system/method for implementing a detection stage of protocol-independent anomaly detection, in accordance with an embodiment the present invention.

With reference to FIG. 14, a block/flow diagram is provided illustrating a system/method 1400 for implementing a detection stage of protocol-independent anomaly detection. During the detection stage, a new network packet is analyzed to detect any existing anomaly based on the new network packet.

For example, at block 1410, at least one new network packet is recorded for detection. Recording the new network packet can include monitoring network interfaces for a network (e.g., ICS network) using packet monitoring. The new network packet can be stored either in a file or memory. Further details regarding block 1410 are described above with reference to component 330 of FIG. 3.

At block 1420, the at least one new network packet can be preprocessed. Preprocessing the one or more network packets can include grouping the at least one new network packet. The at least one new network packet can be grouped by source IP address, source port number, destination IP address, destination port number, and/or protocol number (e.g., a 5-tuple). Each group based on network 5-tuples can be referred to as a "session" and the learning and detection is performed on each session. Preprocessing the at least one new network packet can include receiving a preprocessing model. If any traffic is new and not found in the preprocessing model an alert can be triggered. Further details regarding block 1420 are described above with reference to components 332 of FIG. 3.

At block 1430, byte filtering can be performed based on the preprocessing. More specifically, the byte filtering can determine whether the byte values of the new network packet are included within the byte filtering model. If any new violating pattern is found, the byte filtering component 334 can trigger an alert. Further details regarding block 1430 are described above with reference to components 334 of FIG. 3 and diagram 400 of FIG. 4.

At block 1440, horizontal detection is performed based on the byte filtering and a horizontal model. The horizontal model can be generated by horizontal learning. The horizontal detection can be performed by detecting whether a horizontal constraint anomaly exists in the at least one new network packet. Further details regarding block 1440 are described above with reference to component 336 of FIG. 3 and diagram 1100 of FIG. 11.

At block 1450, message clustering is performed based on the horizontal detection to generate cluster information. The message clustering can determine a cluster of the at least one new network packet based on the probability distribution of the horizontal model, and can output the corresponding cluster information. Further details regarding block 1450 are described above with reference to component 338 of FIG. 3 and diagram 900 of FIG. 9.

At block 1460, vertical detection is performed based on the message clustering and a vertical model. The vertical model can be generated by vertical learning. The vertical detection can be performed by analyzing the temporal pattern of each byte of the at least one new network packet to determine whether a vertical anomaly exists. Further details regarding block 1460 are described above with reference to component 340 of FIG. 3 and diagram 1200 of FIG. 12.

Figure 15:
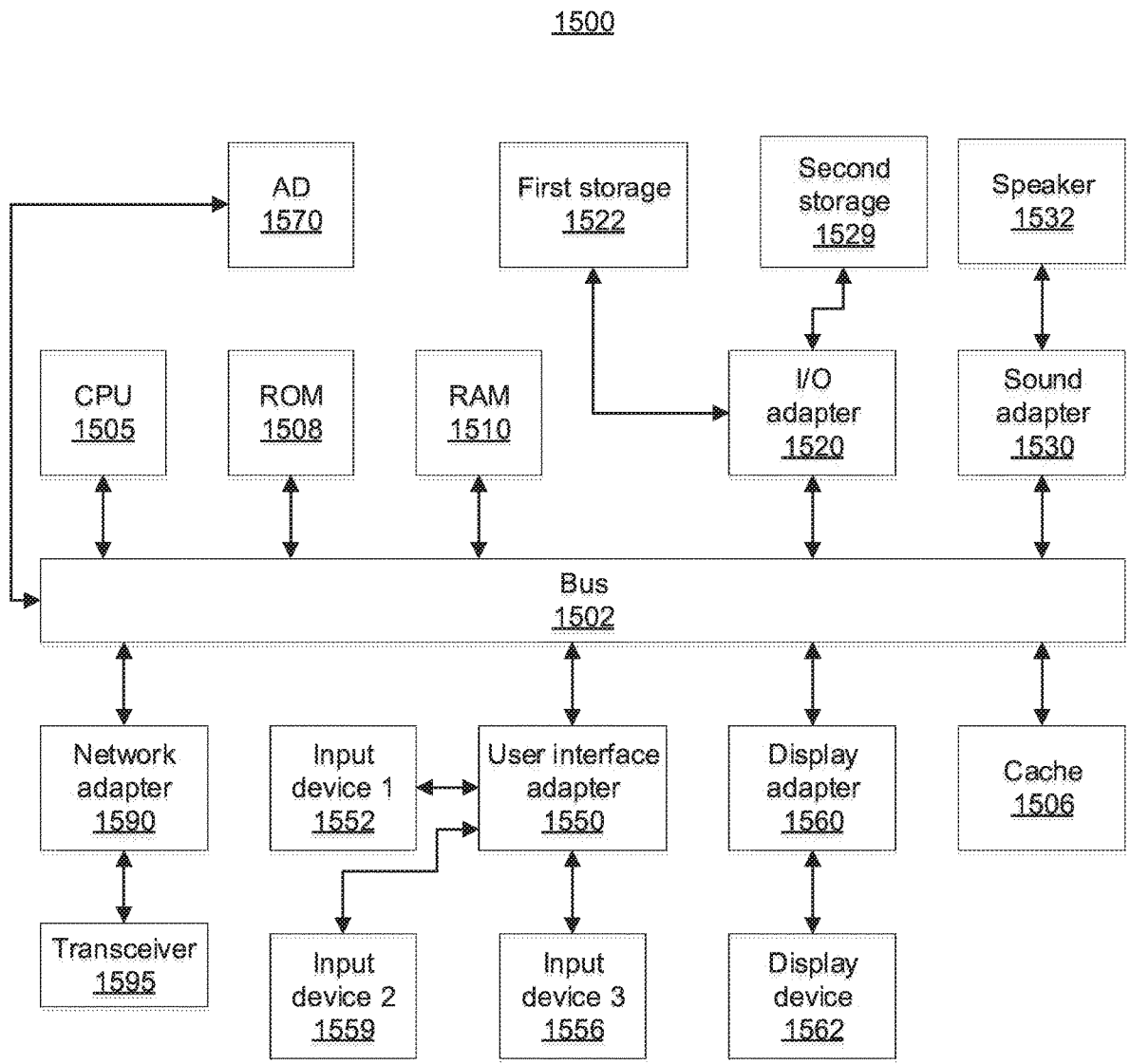
FIG. 15 is a block/flow diagram illustrating a computer system, in accordance with an embodiment the present invention.

Referring now to FIG. 15, an exemplary computer system 1500 is shown which may represent a server or a network device, in accordance with an embodiment of the present invention. The computer system 1500 includes at least one processor (CPU) 1505 operatively coupled to other components via a system bus 1502. A cache 1506, a Read Only Memory (ROM) 1508, a Random-Access Memory (RAM) 1510, an input/output (I/O) adapter 1520, a sound adapter 1530, a network adapter 1590, a user interface adapter 1550, and a display adapter 1560, are operatively coupled to the system bus 1502.

A first storage device 1522 and a second storage device 1529 are operatively coupled to system bus 1502 by the I/O adapter 1520. The storage devices 1522 and 1529 can be any of a disk storage device (e.g., a magnetic or optical disk storage device), a solid state magnetic device, and so forth. The storage devices 1522 and 1529 can be the same type of storage device or different types of storage devices.

A speaker 1532 may be operatively coupled to system bus 1502 by the sound adapter 1530. A transceiver 1595 is operatively coupled to system bus 1502 by network adapter 1590. A display device 1562 is operatively coupled to system bus 1502 by display adapter 1560.

A first user input device 1552, a second user input device 1559, and a third user input device 1556 are operatively coupled to system bus 1502 by user interface adapter 1550. The user input devices 1552, 1559, and 1556 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 1552, 1559, and 1556 can be the same type of user input device or different types of user input devices. The user input devices 1552, 1559, and 1556 are used to input and output information to and from system 1500.

Anomaly detection (AD) component 1570 may be operatively coupled to system bus 1502. AD component 1570 is configured to perform one or more of the operations described above. AD component 1570 can be implemented as a standalone special purpose hardware device, or may be implemented as software stored on a storage device. In the embodiment in which AD component 1570 is software-implemented, although shown as a separate component of the computer system 1500, SR component 1570 can be stored on, e.g., the first storage device 1522 and/or the second storage device 1529. Alternatively, AD component 1570 can be stored on a separate storage device (not shown).

Of course, the computer system 1500 may also include other elements (not shown), as readily contemplated by one of skill in the art, as well as omit certain elements. For example, various other input devices and/or output devices can be included in computer system 1500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 1500 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for implementing protocol-independent anomaly detection within an industrial control system (ICS), comprising:
   implementing a detection stage for the protocol-independent anomaly detection within the ICS, the ICS including unknown network protocols, including:
      performing byte filtering using a byte filtering model based on at least one new network packet associated with the ICS, the byte filtering excluding zero-value entropies and comparatively high-value entropies from learning based on message entropy classification;
      performing horizontal learning based on an output of the byte filtering to generate a horizontal model M, the horizontal learning comprising:
         receiving as input a dataset S of network packets in a normal condition, a byte-level anomaly false positive threshold $\alpha$, and a message-level anomaly false positive threshold $\beta$, wherein $\alpha, \beta \in [0,1]$;
         generating outputs including the horizontal model M, a horizontal filter for bytes $\beta$, internal byte-level horizontal anomaly thresholds for detection $\sigma$, and internal message-level anomaly thresholds for detection $\eta$ based on the received input;
      performing horizontal detection to determine whether a horizontal constraint anomaly exists in the at least one new network packet based on the byte filtering and the generated horizontal model, including analyzing constraints across different bytes of the at least one new network packet;
      performing message clustering based on the horizontal detection to generate first cluster information; and
      performing vertical detection to determine whether a vertical anomaly exists based on the first cluster information and a vertical model, including analyzing a temporal pattern of each byte of the at least one new network packet.

2. The method of claim 1, where implementing the detection stage further includes:
   recording the at least one new network packet for detection; and
   preprocessing the at least one new network packet, including grouping the at least one new network packet with at least one existing network packet into at least one session by source IP address, source port number, destination IP address, destination port number, and protocol number the network packets.

3. The method of claim 2, wherein preprocessing the at least one new network packet further includes determining new traffic based on a preprocessing model, and triggering an alert in response to the new traffic.

4. The method of claim 1, wherein performing the byte filtering further includes finding a new violating pattern based on the byte filtering model, and triggering an alert in response to finding the new violating pattern.

5. The method of claim 1, wherein performing the message clustering further includes determining a cluster of the at least one new network packet based on a probability distribution of the horizontal model.

6. The method of claim 1, further comprising implementing a learning stage, including:
   performing byte filtering based on one or more network packets to generate the byte filtering model;
   performing message clustering based on the horizontal learning to generate second cluster information; and
   performing vertical learning based on the second cluster information to generate a vertical model.

7. The method of claim 6, wherein implementing the learning stage further includes:
   recording the one or more network packets for learning; and
   preprocessing the one or more network packets.

8. A computer program product comprising a non-transitory computer readable storage medium having program instructions embodied therewith, the program instructions executable by a computer to cause the computer to perform a method for implementing protocol-independent anomaly detection, the method performed by the computer comprising:
   implementing a detection stage for the protocol-independent anomaly detection within the ICS, the ICS including unknown network protocols, including:
   performing byte filtering using a byte filtering model based on at least one new network packet associated with the ICS, the byte filtering excluding zero-value entropies and comparatively high-value entropies from learning based on message entropy classification;
   performing horizontal learning based on an output of the byte filtering to generate a horizontal model M, the horizontal learning comprising:
      receiving as input a dataset S of network packets in a normal condition, a byte-level anomaly false positive threshold $\alpha$, and a message-level anomaly false positive threshold $\beta$, where $\alpha, \beta \in [0,1]$;
      generating outputs including the horizontal model M, a horizontal filter for bytes B, internal byte-level horizontal anomaly thresholds for detection $\sigma$, and internal message-level anomaly thresholds for detection $\eta$ based on the received input
   performing horizontal detection to determine whether a horizontal constraint anomaly exists in the at least one new network packet based on the byte filtering and the generated horizontal model, including analyzing constraints across different bytes of the at least one new network packet;
   performing message clustering based on the horizontal detection to generate first cluster information; and
   performing vertical detection to determine whether a vertical anomaly exists based on the first cluster information and a vertical model, including analyzing a temporal pattern of each byte of the at least one new network packet.

9. The computer program product of claim 8, where implementing the detection stage further includes:
   recording the at least one new network packet for detection; and
   preprocessing the at least one new network packet, including grouping the at least one new network packet with at least one existing network packet into at least one session by source IP address, source port number, destination IP address, destination port number, and protocol number of the network packets.

10. The computer program product of claim 9, wherein preprocessing the at least one new network packet further includes determining new traffic based on a preprocessing model, and triggering an alert in response to the new traffic.

11. The computer program product of claim 8, wherein performing the byte filtering further includes finding a new violating pattern based on the byte filtering model, and triggering an alert in response to finding the new violating pattern.

12. The computer program product of claim 8, wherein performing the message clustering further includes determining a cluster of the at least one new network packet based on a probability distribution of the horizontal model.

13. The computer program product of claim 8, wherein the method further includes implementing a learning stage, including:
   performing byte filtering based on one or more network packets to generate the byte filtering model;
   performing message clustering based on the horizontal learning to generate second cluster information; and
   performing vertical learning based on the second cluster information.

14. The computer program product of claim 13, wherein implementing the learning stage further includes:
   recording the one or more network packets for learning; and
   preprocessing the one or more network packets.

15. A system for implementing protocol-independent anomaly detection within an industrial control system (ICS), comprising:
   a memory device for storing program code; and
   at least one processor device operatively coupled to a memory device and configured to execute program code stored on the memory device to:
   implement a detection stage for the protocol-independent anomaly detection within the ICS, the ICS including unknown network protocols, by:
   performing byte filtering using a byte filtering model based on at least performing byte filtering using a byte filtering model based on at least one new network packet associated with the ICS, the byte filtering excluding zero-value entropies and comparatively high-value entropies from learning based on message entropy classification;
   performing horizontal learning based on an output of byte filtering to generate a horizontal model M, the horizontal learning comprising:
      receiving as input a dataset S of network packets in a normal condition, a byte-level anomaly false positive threshold $\alpha$, and a message-level anomaly false positive threshold $\beta$, where $\alpha, \beta \in [0,1]$;
      generating outputs including the horizontal model M, a horizontal filter for bytes B, internal byte-level horizontal anomaly thresholds for detection $\sigma$, and internal message-level anomaly thresholds for detection $\eta$ based on the received input;
   performing horizontal detection to determine whether a horizontal constraint anomaly exists in the at least one new network packet based on the byte filtering and the generated horizontal model, including analyzing constraints across different bytes of the at least one new network packet;
   performing message clustering based on the horizontal detection to generate first cluster information; and
   performing vertical detection to determine whether a vertical anomaly exists based on the first cluster information and a vertical model, including analyzing a temporal pattern of each byte of the at least one new network packet.

16. The system of claim 15, wherein the at least one processor device is further configured to implement the detection stage by:
   recording the at least one new network packet for detection; and
   preprocessing the at least one new network packet, including grouping the at least one new network packet with at least one existing network packet into at least one session by source IP address, source port number, destination IP address, destination port number, and protocol number of the network packets.

17. The system of claim 16, wherein the at least one processor device is further configured to preprocess the at least one new network packet by determining new traffic based on a preprocessing model, and triggering an alert in response to the new traffic.

18. The system of claim 15, wherein the at least one processor device is further configured to perform the byte filtering by finding a new violating pattern based on the byte filtering model, and triggering an alert in response to finding the new violating pattern.

19. The system of claim 15, wherein the at least one processor device is further configured to perform the message clustering by determining a cluster of the at least one new network packet based on a probability distribution of the horizontal model.

20. The system of claim 15, wherein the at least one processor device is further configured to implement a learning stage by:
   recording one or more network packets for learning
   preprocessing the one or more network packets;
   performing byte filtering based on the preprocessing of the one or more network packets to generate the byte filtering model;
   performing message clustering based on the horizontal learning to generate second cluster information; and
   performing vertical learning based on the second cluster information.

* * * * *